United States Patent
Hedrick et al.

(10) Patent No.: US 7,290,584 B2
(45) Date of Patent: Nov. 6, 2007

(54) SYSTEM AND METHOD FOR WELDING WAX PATTERNS

(75) Inventors: Keith F. Hedrick, Modena, NY (US); Keith B. Gardener, Monroe, NY (US)

(73) Assignee: MPI Incorporated, Poughkeepsie, NY (US)

( * ) Notice: Subject to any disclaimer, the term of this patent is extended or adjusted under 35 U.S.C. 154(b) by 0 days.

(21) Appl. No.: 11/282,009

(22) Filed: Nov. 17, 2005

(65) Prior Publication Data

US 2007/0107868 A1 May 17, 2007

(51) Int. Cl.
*B22C 7/00* (2006.01)
(52) U.S. Cl. .............................. 164/45; 164/35; 228/51
(58) Field of Classification Search ................ 164/35, 164/45, 516–519, 235; 228/51–55
See application file for complete search history.

(56) References Cited

U.S. PATENT DOCUMENTS 5,109,147 A * 4/1992 Erlach ..................... 219/85.16
6,957,686 B2 * 10/2005 Puffer et al. ................... 164/45

* cited by examiner

*Primary Examiner*—Kuang Lin
(74) *Attorney, Agent, or Firm*—Heslin Rothenberg Farley & Mesiti P.C.; Nicholas Mesiti, Esq.; Victor A. Cardona, Esq.

(57) ABSTRACT

A wax pattern welding system and method for producing a pool of molten wax on an area of a surface of a wax component is provided. The wax pattern welding system includes a bar of heat conducting material and a heating element. The bar has a raised heating surface, which has a recessed area for retaining molten wax when the raised heating surface contacts the wax component, and a vent structure. The vent structure facilitates confining the pool of molten wax on an area of a surface of the wax component. In another embodiment, the pattern welding system includes an attachable plate of heat conducting material, which has a raised heating surface with a recessed area, and a vent structure. The attachable plate is configured to be fastened to the bar of heat conducting material.

18 Claims, 8 Drawing Sheets

SYSTEM AND METHOD FOR WELDING WAX PATTERNS

BACKGROUND OF THE INVENTION

1. Technical Field

The present invention generally relates to apparatus for welding wax components. More particularly, the present invention relates to heating an area of a surface of a wax runner to form a confined wax pool thereon in preparation for fusing a wax pattern to the wax runner to prevent excess molten wax from running over the side of the wax runner.

2. Background Information

The Lost Wax Process is a long-established process for casting metal parts. In the practice of the Lost Wax Process, a wax pattern of a part to be cast is molded in wax. When the wax pattern is molded, a pattern gate is molded with the wax pattern in one piece. Wax runners are also molded separately. Wax runners are usually at least one branch, frequently with flat surfaces and two ends. Some wax runners have a circular cross section and thus do not have either flat surfaces or edges. At one end of the runners there is a head and the other end there is a tail. A pour cup may be located at the head. The wax patterns are affixed by their gates to the wax runners to form a wax tree. In order to fuse the gate of a wax pattern to a wax runner, both the surface of the wax pattern's gate and the surface of the wax runner are heated sufficiently to melt wax to permit fusion. Once the wax patterns are affixed to the wax runner, a wax tree has been formed. Then ceramic material is placed on the wax tree. After the ceramic has hardened, the ceramic-coated wax tree is heated, causing the wax to melt and flow out of the ceramic. Removal of the wax yields a ceramic mold into which molten metal is poured to produce the desired part.

In recent times, much of the Lost Wax Art has been substantially automated. In U.S. Pat. No. 6,910,519 issued to Ludwig, et al., entitled "Process and Apparatus for Assembly of Wax Trees," assigned to the same assignee, an advanced process and apparatus is taught for automating the fusion of wax gates of wax patterns to a wax runner. As taught in this patent, a heated blade is used to heat the wax pattern gates and the wax runner before they are fused together.

Since it may be difficult to hold a surface of a wax runner in a flat, horizontal position when attaching the wax patterns, portions of the wax runner may be penetrated more deeply by the heated blade than other portions. When this occurs, excess molten wax may be produced on some areas of the wax runner, and if the excess melted wax runs over the side of the wax runner, the wax runner and the wax patterns attached to it are not useable. This results in lost product. A similar problem may occur due to variations in the surface of a wax runner or warping of the wax runner.

Therefore, a need exists for wax pattern welding apparatus and a method of heating wax on the surface of a wax component that produce a pool of molten wax which is confined to an area of the surface of the wax runner to prevent excess molten wax from running over the side of the wax runner.

SUMMARY OF THE INVENTION

The present invention provides a wax pattern welding system and method for producing a pool of molten wax on an area of a surface of a wax component. In one aspect, the wax pattern welding system comprises a piece (e.g., a bar) of heat conducting material, which includes a raised heating surface that is configured to contact a wax component, another surface, and a vent structure, and means for heating the raised heating surface. The raised heating surface has a recessed area for retaining molten wax when the raised heating surface contacts the wax component. The vent structure facilitates confining a pool of molten wax on an area of a surface of the wax component by providing a passage between the recessed area of the raised heating surface and an opening in another surface for the equalization of gas pressure in the recessed area with an ambient gas pressure.

In another aspect, the pattern welding system comprises a piece of heat conducting material, means for heating the piece of heat conducting material, and an attachable piece (e.g., a plate) of heat conducting material. The attachable piece of heat conducting material includes a raised heating surface configured to contact a wax component, another surface, and a vent structure, and the raised heating surface of the attachable piece of heat conducting material has a recessed area for retaining molten wax when the raised heating surface contacts the wax component. The vent structure of the attachable piece of heat conducting material facilitates confining a pool of molten wax on an area of a surface of the wax component by providing a passage between the recessed area and an opening in another surface of the attachable piece for the equalization of gas pressure in the recessed area with the ambient gas pressure. The attachable piece of heat conducting material is configured to be fastened to the piece of heat conducting material in a manner such that the raised heating surface may be heated by the means for heating the piece of heat conducting material.

In addition, methods are described and claimed herein for producing a pool of molten wax on an area of a surface of a wax component using the wax pattern welding system in preparation for fusing the wax component to another wax component in assembling a wax tree. These methods comprise the following steps: providing a piece of heat conducting material including a raised heating surface, another surface, and a vent structure; heating the raised heating surface; and temporarily positioning the raised heating surface of the piece in contact with the wax component. The raised heating surface of the piece of heat conducting material provided is configured to contact a wax component and comprises a recessed area for retaining molten wax when the raised heating surface contacts the wax component. The vent structure of the piece of heat conducting material provided facilitates confining a pool of molten wax on an area of a surface of the wax component by providing a passage between the recessed area and an opening in another surface of the piece for the equalization of gas pressure in the recessed area with an ambient gas pressure.

These and other features and advantages of this invention will become apparent from the following detailed description of the various aspects of the invention taken in conjunction with the accompanying drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with the present invention, a heated wax-welding apparatus, suitable for automated wax tree assembly, is provided. This wax pattern welding system is configured to produce a pool of molten wax on an area of a surface of a wax component, such as a wax runner, where another wax component, such as a wax pattern, will be fused to the wax component. The fusing of wax components to assemble a wax tree used in the lost wax casting process is sometimes referred to as wax welding or simply welding.

Figure 1:
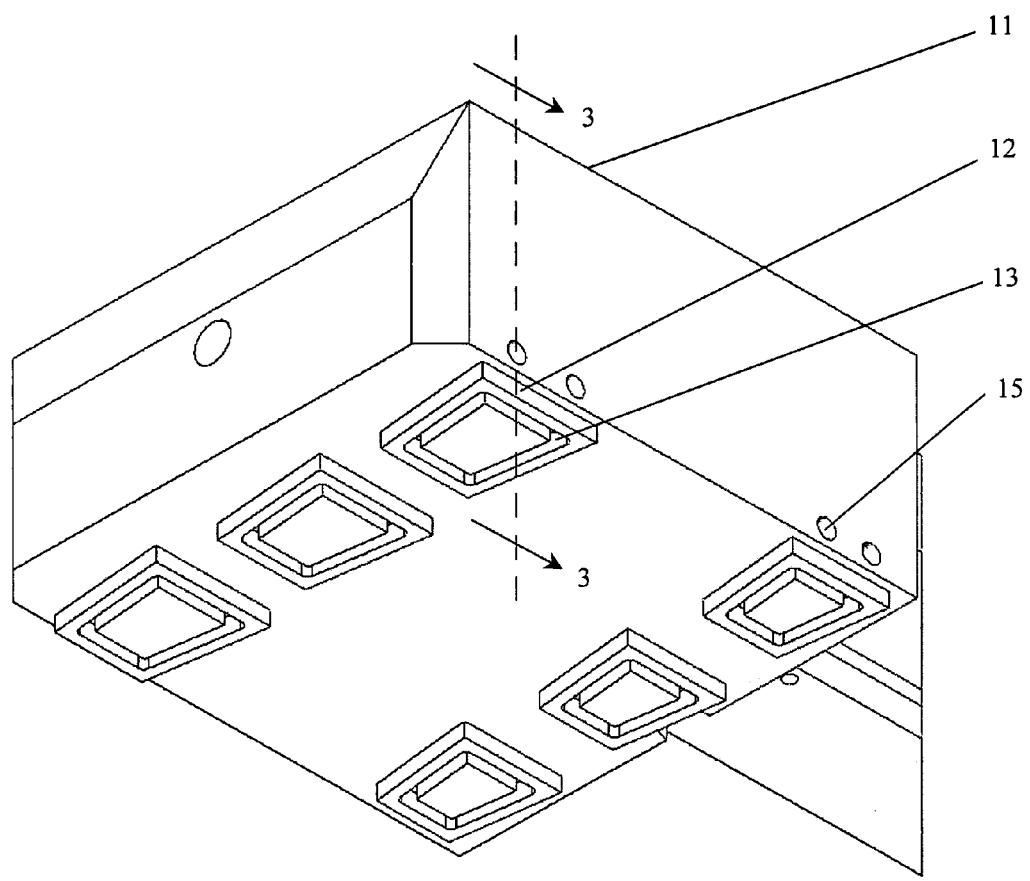
FIG. 1 illustrates a perspective view of one embodiment of a wax pattern welding system in accordance with the present invention.

FIG. 1 illustrates a perspective view of one embodiment of a wax pattern welding system in accordance with the present invention. The wax pattern welding system illustrated in FIG. 1 comprises a bar of heat conducting material 11 having a plurality of features or raised heating surfaces 12. These features or raised heating surfaces 12 are configured to contact a wax component, such as a wax runner, and each raised heating surface has a recessed area for retaining molten wax when the raised heating surface contacts a wax component. In the embodiment illustrated in FIG. 1, this recessed area comprises a groove 13 that has been machined into the raised heating surface 12. In the example shown in FIG. 1, groove 13 forms a continuous or closed channel that is adjacent to the border of raised heating surface 12.

The bar of heat conducting material 11 also includes a vent structure that provides a passage between the recessed area and an opening 15 in another surface of the bar of heat conducting material. The vent structure facilitates confining a pool of molten wax on an area of a surface of a wax component by providing the passage for equalization of gas pressure in the recessed area with an ambient gas pressure as molten wax flows into and out of the recessed area. In addition, a wax pattern welding system in accordance with the present invention comprises means for heating the raised heating surface. In one embodiment, the means for heating the raised heating surface comprises an electrical heating element.

Figure 2:
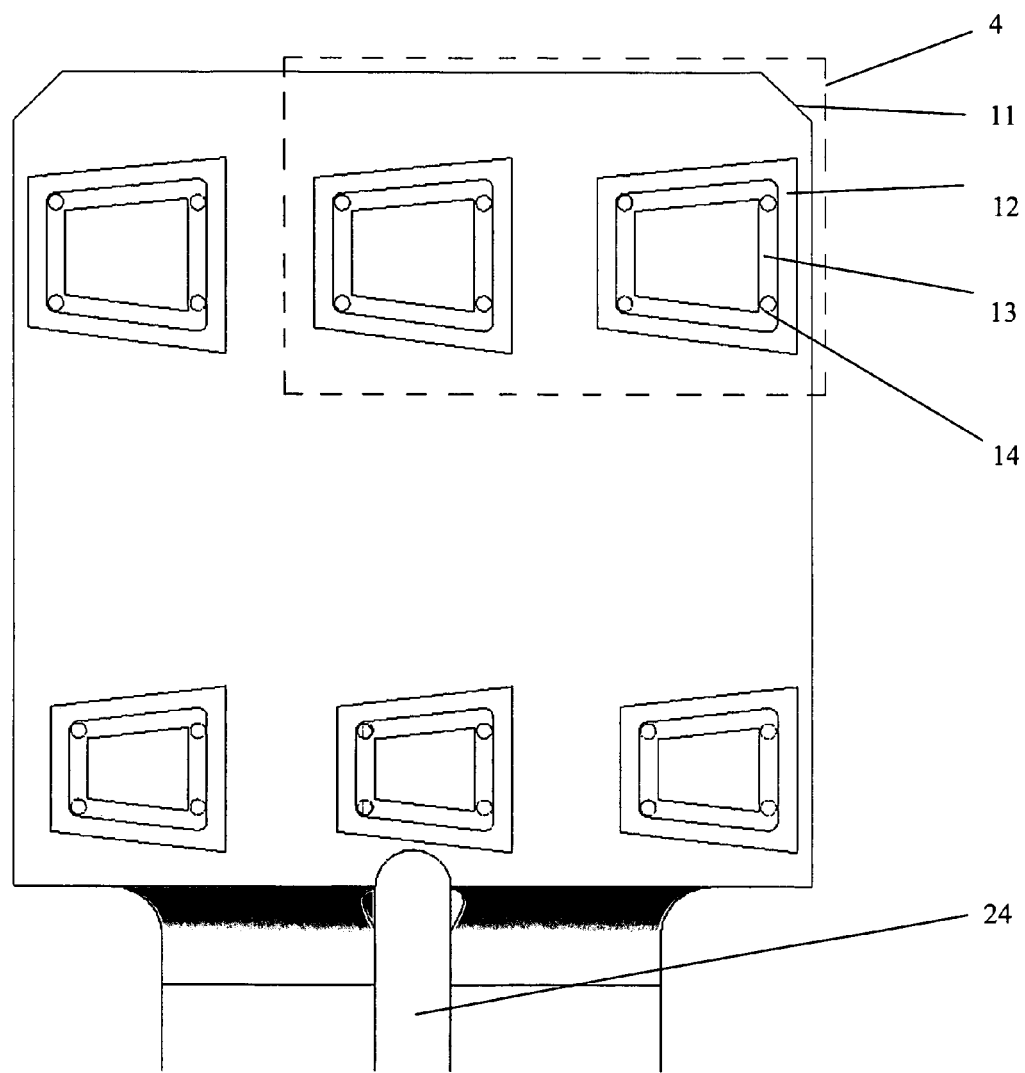
FIG. 2 illustrates a bottom view of the embodiment of a wax pattern welding system shown in FIG. 1.

FIG. 2 illustrates a bottom view of the embodiment of a wax pattern welding system shown in FIG. 1. This view shows vent holes 14 in groove 13 of raised heating surface 12. Also, the bottom view of FIG. 2 shows a portion of heating element 24 protruding from the bar of heat conducting material.

Figure 3:
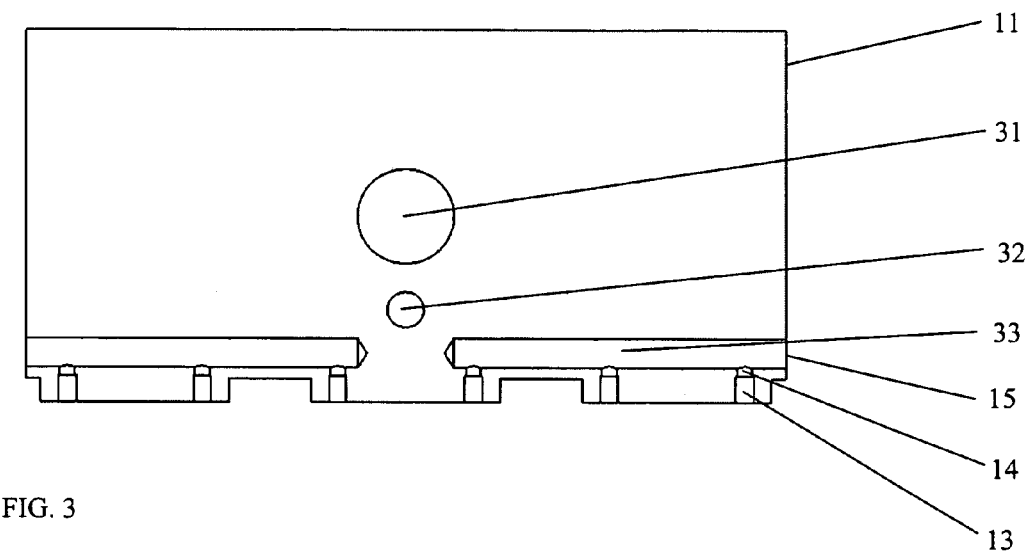
FIG. 3 illustrates a cross sectional view of the embodiment of a wax pattern welding system shown in FIG. 1 as viewed along section lines 3-3 in FIG. 1.

FIG. 3 illustrates a cross sectional view of the embodiment of a wax pattern welding system shown in FIG. 1 as viewed along section lines 3-3 in FIG. 1. This view shows vent structure 33 providing a passage between grooves 13 via vent holes 14 and an opening 15 in another surface of the bar of heat conducting material. As illustrated in FIG. 3, the bar of heat conducting material 11 also has heating element cavity 31 for a heating element that heats the raised heating surfaces and temperature sensor cavity 32 for a temperature sensor.

Figure 4:
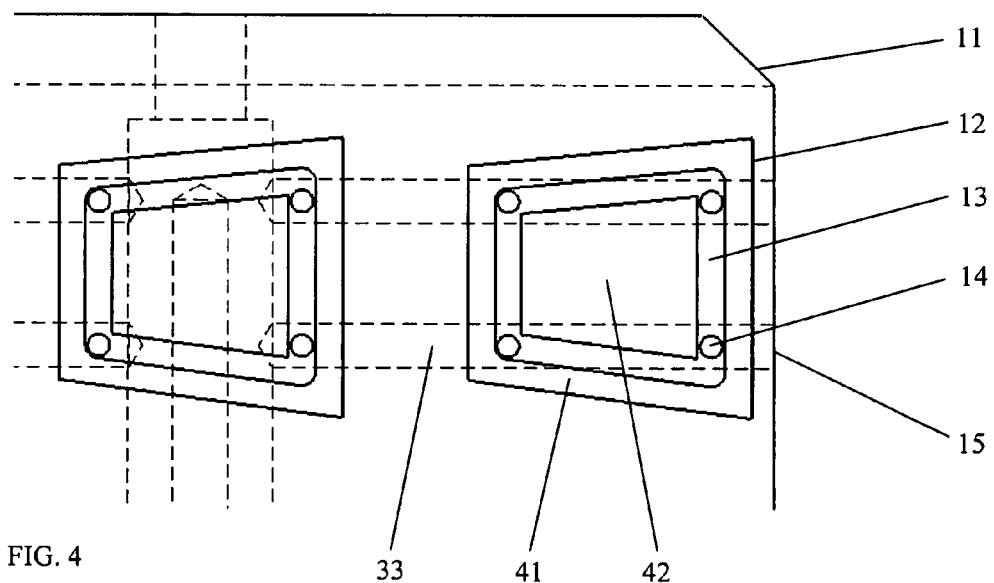
FIG. 4 illustrates a detailed view of the raised heating surfaces shown in FIG. 2 as indicated by detail 4 in FIG. 2.

FIG. 4 illustrates a detailed view of the raised heating surfaces 12 shown in FIG. 2 as indicated by detail 4 in FIG. 2. As illustrated in FIG. 4, raised heating surface 12 comprises groove 13 having vent holes 14 to a vent structure 33 having an opening 15 in another side of the bar of heat conducting material. In this embodiment of the invention, groove 13 is configured as a closed, continuous channel that segments raised heating surface 12 into border 41 and land 42. Advantageously, molten wax displaced by land 42, as raised heating surface 12 heats and penetrates the surface of a wax component, flows into groove 13 because groove 13 surrounds land 42 in this embodiment.

The following is a more detailed discussion of the operation of a wax pattern welding system in accordance with the present invention with reference to the embodiment illustrated in FIGS. 1, 2, 3, and 4. Raised heating surface 12 is configured to contact a wax component such as a wax runner. The recessed area of raised heating surface retains molten wax that is displaced when raised heating surface 12 contacts a wax component. As molten wax flows into the recessed area, the vent structure provides a passage to vent gas pressure that would otherwise build in the recessed area as the molten wax displaces gas in the recessed area into a smaller volume. The relief of gas pressure in the recessed area mitigates the displacement of molten wax beyond the desired footprint of the wax pool during the interval in which the raised heating surface contacts the wax component.

Similarly, the formation of the desired wax pool on an area of the surface of the wax component is also facilitated as the raised heating surface is retracted from a wax component because maintaining the ambient gas pressure in the recessed area facilitates the flow of molten wax from the recessed area. This mitigates the build-up of residual wax on the raised heating surface and consequent loss of wax. It is advantageous to avoid the build-up of residual wax on the wax pattern welding system because such build-up could cause undesirable variation in the wax welding process and wax drip on the wax component.

Figure 5:
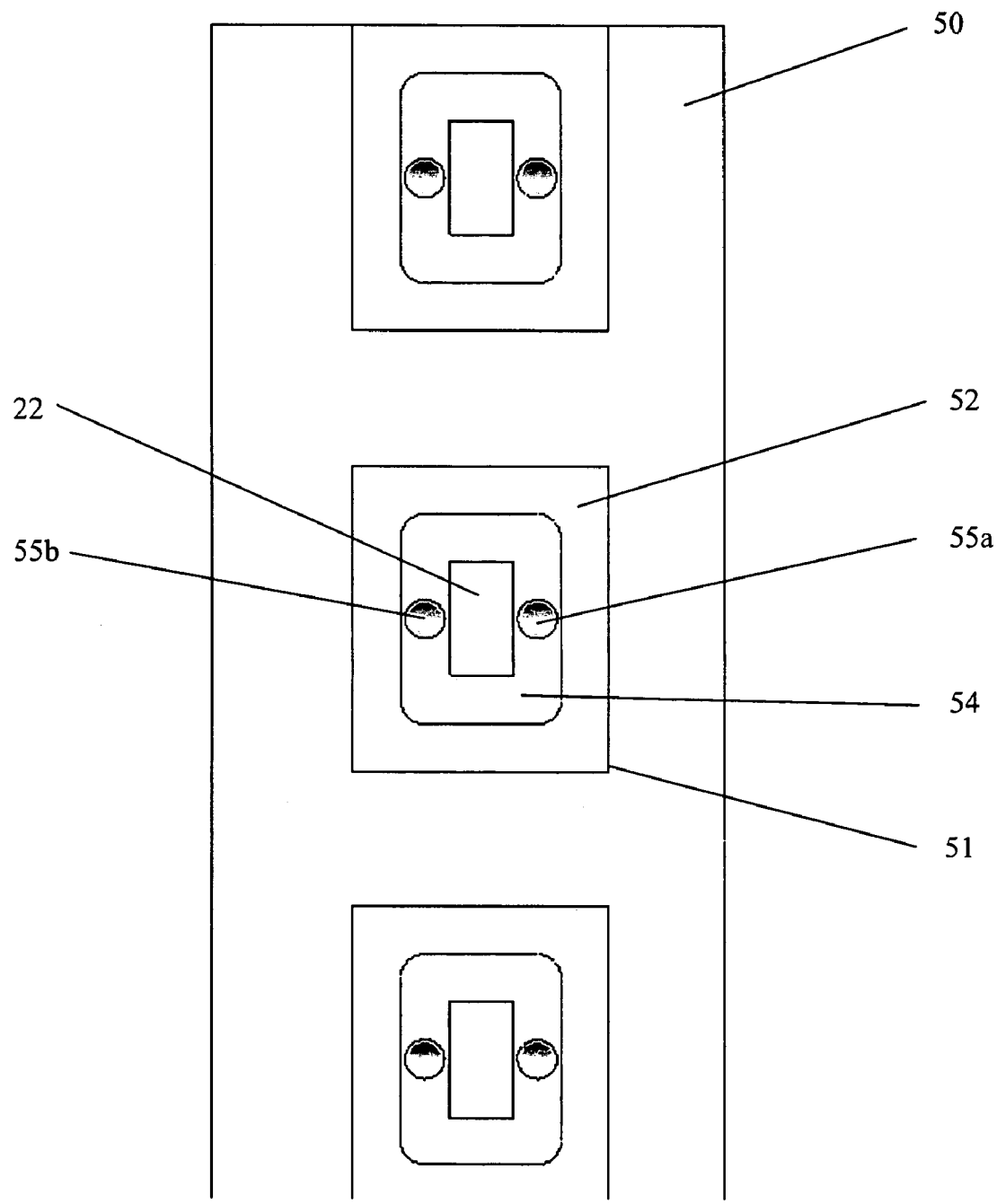
FIG. 5 illustrates a bottom view of another embodiment of a wax pattern welding system having rectangular raised heating surfaces.

FIG. 5 illustrates a bottom view 50 of another embodiment of a wax pattern welding system. In this embodiment, the raised heating surface 51 has a rectangular shape. Groove 54 provides a closed channel that is adjacent to border 52, and groove 54 surrounds a rectangular land 53. In this embodiment, groove 54 has two vent holes, 55a and 55b, connecting to at least one vent structure.

Figure 6:
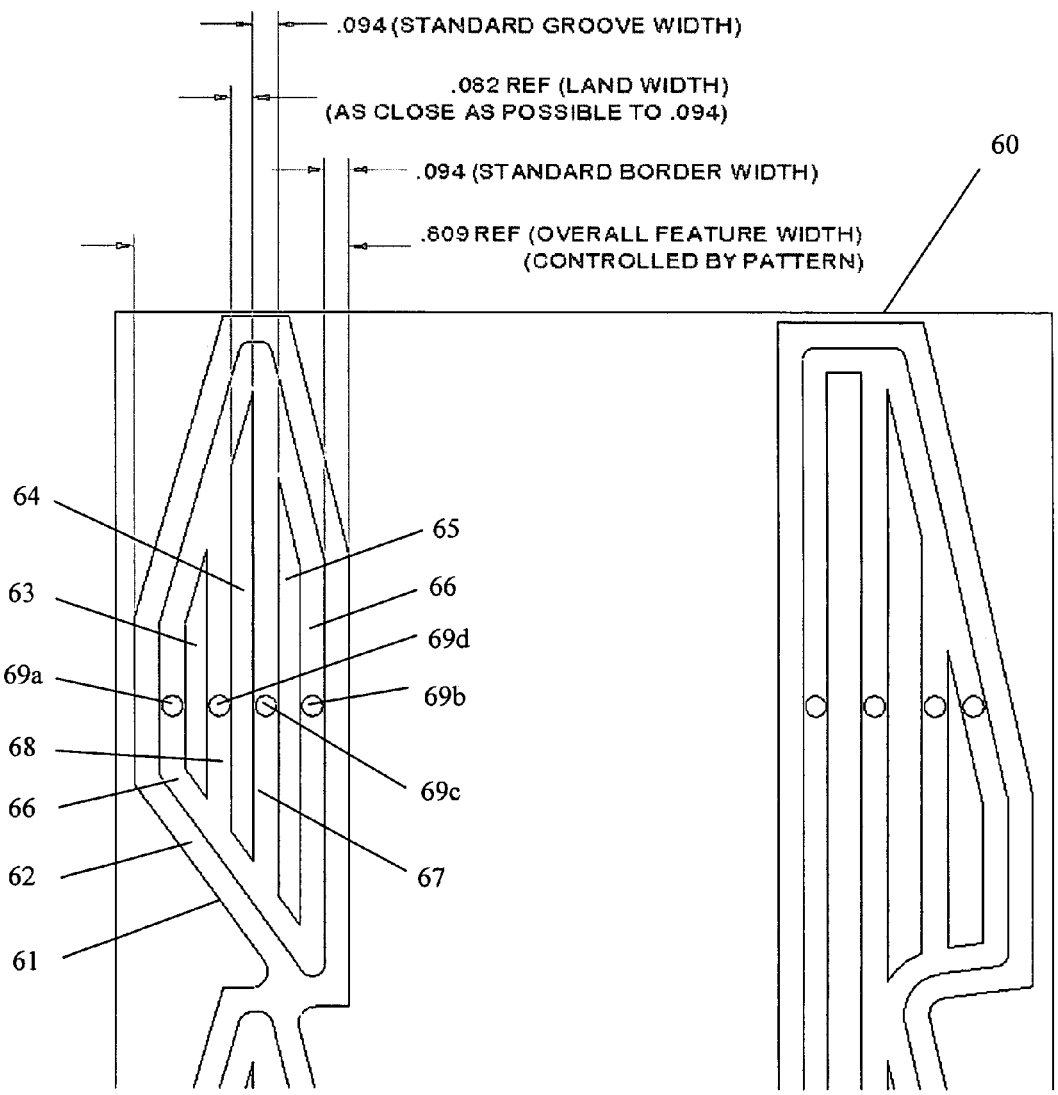
FIG. 6 illustrates a partial bottom view of an embodiment of a wax pattern welding system comprising two distinct raised heating surfaces having a plurality of connected grooves.

FIG. 6 illustrates a partial bottom view 60 of an embodiment of a wax pattern welding system comprising two distinct raised heating surfaces having a plurality of connected grooves. By way of example, raised heating surface 61 comprises border 62 adjacent to perimeter groove 66, which surrounds a plurality of lands (63, 64, and 65). Lands 63, 64, and 65 are further delimited by inner grooves 67 and 68, which connect with perimeter groove 66. In the example of raised heating surface 61, perimeter groove 66 has two vent holes, 69a and 69b, and inner grooves 67 and 68 each have one vent hole, vent holes 69c and 69d, respectively. As a result, each of the vertically-oriented segments of perimeter groove 66 and inner grooves 67 and 68 has a vent hole. As illustrated in FIG. 6, the widths of perimeter groove 66 and inner grooves 67 and 68 are approximately 0.094 inch. Border 62 is approximately the same width as the grooves in raised heating surface 61, whereas lands 63, 64, and 65 are slightly narrower (0.082 inch) in the example illustrated in FIG. 6.

Figure 7:
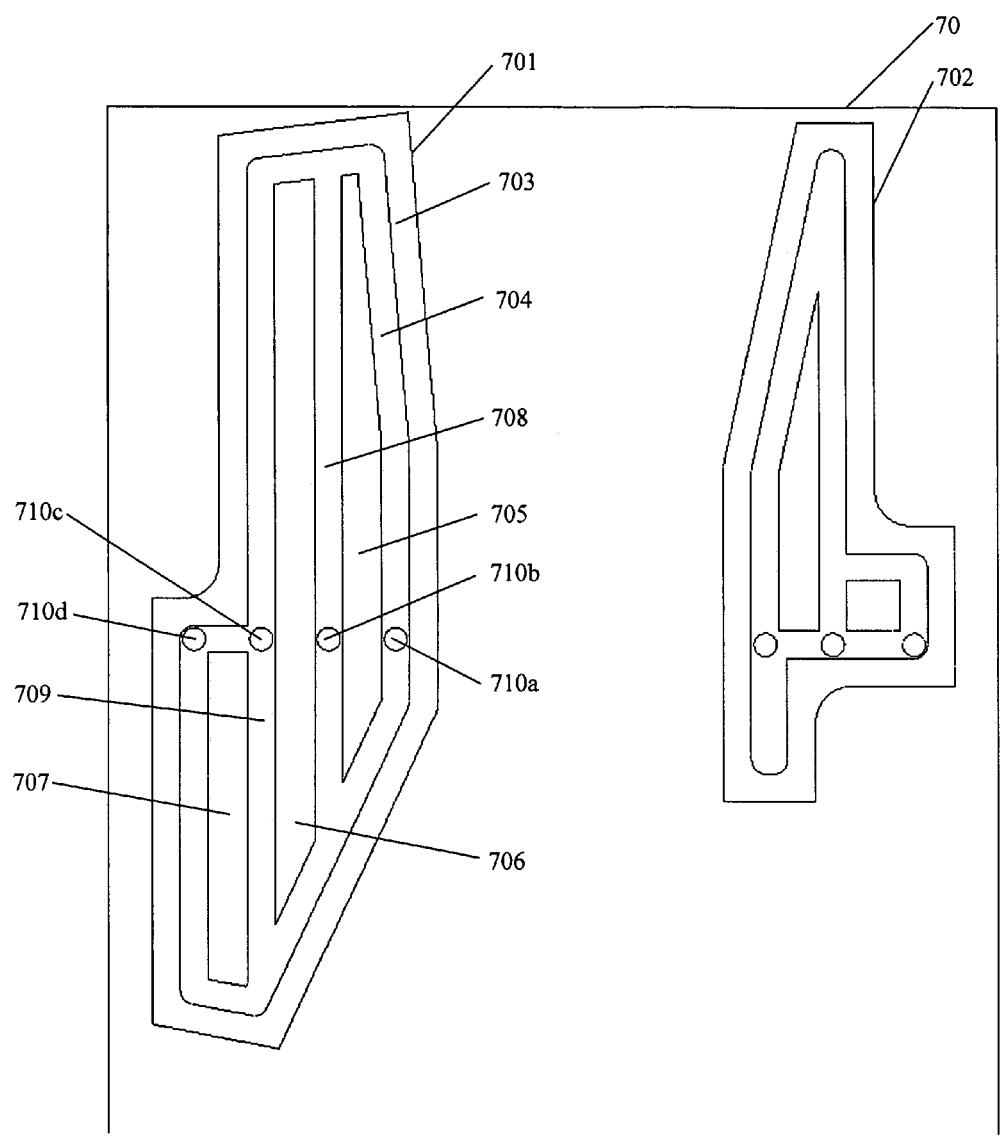
FIG. 7 illustrates a partial bottom view of another embodiment of a wax pattern welding system comprising two distinct raised heating surfaces having a plurality of connected grooves.

FIG. 7 illustrates a partial bottom view 70 of another embodiment of a wax pattern welding system comprising two distinct raised heating surfaces having a plurality of connected grooves. By way of example, raised heating surface 701 comprises border 703 adjacent to perimeter groove 704. Perimeter groove 704 surrounds three lands (705, 706, and 707). Lands 705, 706, and 707 are delimited by perimeter groove 704 and inner grooves 708 and 709, which connect with perimeter groove 704. In the example of raised heating surface 701, perimeter groove 704 has the general shape of border 703. The shapes of raised heating surface 701 and raised heating surface 702 correspond to the shapes of the gates of wax patterns to be welded to another wax component (e.g., a wax runner).

Figure 8:
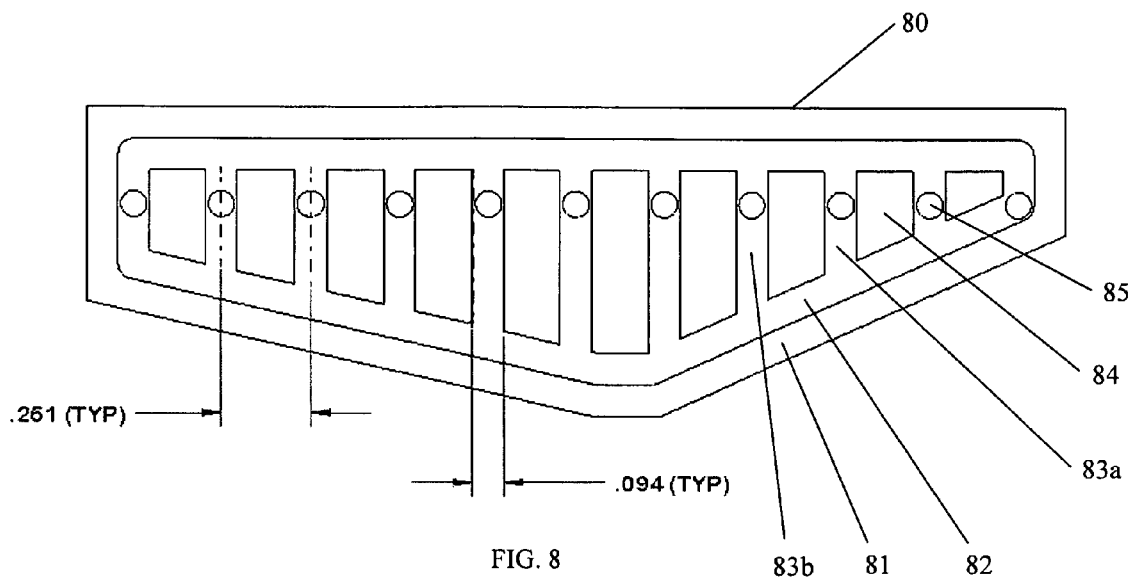
FIG. 8 illustrates a bottom view of an example of a raised heating surface for an embodiment of a wax pattern welding system in which vent holes are located in every other groove segment.
Figure 9:
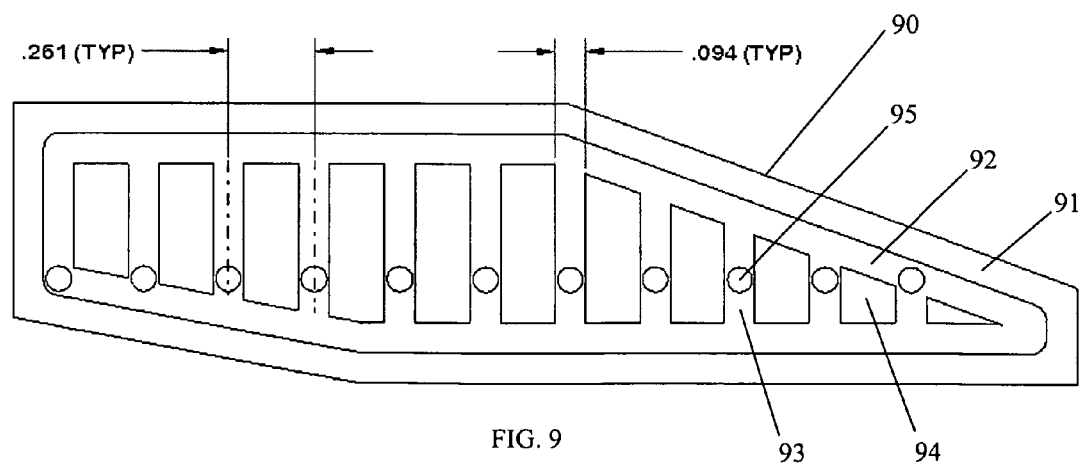
FIG. 9 illustrates a bottom view of another example of a raised heating surface for an embodiment of a wax pattern welding system in which vent holes are located in every other groove segment.

FIG. 8 and FIG. 9 illustrate bottom views of two further examples of raised heating surfaces for embodiments of a wax pattern welding system in accordance with the present invention. In the examples of FIGS. 8 and 9, vent holes are located in every other vertically-oriented groove segment along a horizontal line. That is, each groove having a vent hole is separated from the next groove having a vent hole by two lands and an unvented groove. In the example illustrated in FIG. 8, the lands are approximately the same width as the grooves. In the example illustrated in FIG. 9, the lands are approximately twice as wide as the grooves. Also, the vent holes are located along a line in the examples illustrated in FIG. 8 and FIG. 9. While a linear arrangement of vent holes in these examples advantageously simplifies the connection of more than one groove to a vent structure, it should be noted that it is not necessary to position the vent holes of the grooves in a raised heating surface along a single line.

In preferred embodiments of the invention, the total volume of the grooves in the raised heating surface exceeds the expected volume of wax displaced by the lands of the raised heating surface when the raised heating surface penetrates a wax component to the desired depth. These embodiments are advantageous because the volume of the grooves or recessed area is sufficient to retain the molten wax displaced by the lands of the raised heating surface. The expected volume of wax displaced by the lands of the raised heating surface may be determined from the total surface area of the lands and the period of time that the raised heating surface contacts the wax component.

In one embodiment of the invention, the grooves of the raised heating surface are configured to cover approximately one half of the total surface area of the raised heating surface. With respect to this embodiment, the total surface area of the raised heating surface includes the surface areas of the border, grooves, and lands.

In further preferred embodiments, the raised heating surface of the wax pattern welding system includes a continuous border that serves as a barrier to molten wax retained in interior grooves (i.e., grooves which are surrounded by the border). In these embodiments, the continuous border advantageously prevents or inhibits molten wax from flowing beyond the intended area for the pool of molten wax produced on the surface the wax component.

In another embodiment, the cross-sectional area of a vent structure opening in the side of the wax pattern welding system is approximately two times greater than the total area of the vent holes connecting to the vent structure. In a yet another embodiment, there is at least one vent hole in each groove in the raised heating surface, and if a groove is longer than one inch, there is an additional vent hole for each additional inch of groove. FIG. 4 illustrates one example of such an embodiment in which the groove has four vent holes.

In accordance with another embodiment of the present invention, the pattern welding system comprises a bar of heat conducting material, means for heating the bar of heat conducting material, and an attachable plate of heat conducting material. The attachable plate of heat conducting material includes a raised heating surface configured to contact a wax component, another surface, and a vent structure, and the raised heating surface of the attachable plate of heat conducting material has a recessed area for retaining molten wax when the raised heating surface contacts the wax component. The vent structure of the attachable plate of heat conducting material facilitates confining a pool of molten wax on an area of a surface of the wax component by providing a passage between the recessed area and an opening in another surface of the attachable plate for the equalization of gas pressure in the recessed area with the ambient gas pressure. The attachable plate of heat conducting material is configured to be fastened to the bar of heat conducting material in a manner such that the raised heating surface may be heated by the means for heating the bar of heat conducting material. For example, the attachable plate may be bolted to the bar of heat conducting material such that a surface of the attachable plate is held in contact with a surface of the bar to permit heat transfer. If the attachable plate is bolted to the bar, the pattern welding system may be adapted for welding a different type of wax pattern having a different gate shape by unbolting the currently fastened attachable plate and bolting another attachable plate having the required raised heating surface or surfaces to the bar of heat conducting material.

In a further embodiment of a wax pattern welding system in accordance with the present invention, the bar of heat conducting material has two opposed and generally parallel heating surfaces. One of the heating surfaces is configured for contacting a wax pattern gate, and the opposed heating surface is configured for contacting a wax runner. The heating surface configured for contacting the wax runner includes at least one raised feature or raised heating surface having a vented recessed area for retaining molten wax when the raised heating surface contacts the wax runner. In one such embodiment, the vented recessed area comprises a groove with at least one vent as disclosed hereinabove. A wax pattern welding system in accordance with the present invention may be utilized for melting wax on a wax runner and wax patterns in a process and system for the assembly of wax trees such as that described in U.S. Pat. No. 6,910,519 and U.S. patent application Ser. No. 11/152,000, for example. U.S. Pat. No. 6,910,519 and U.S. patent application Ser. No. 11/152,000, which are both assigned to the instant assignee, are incorporated by reference herein.

Figure 10:
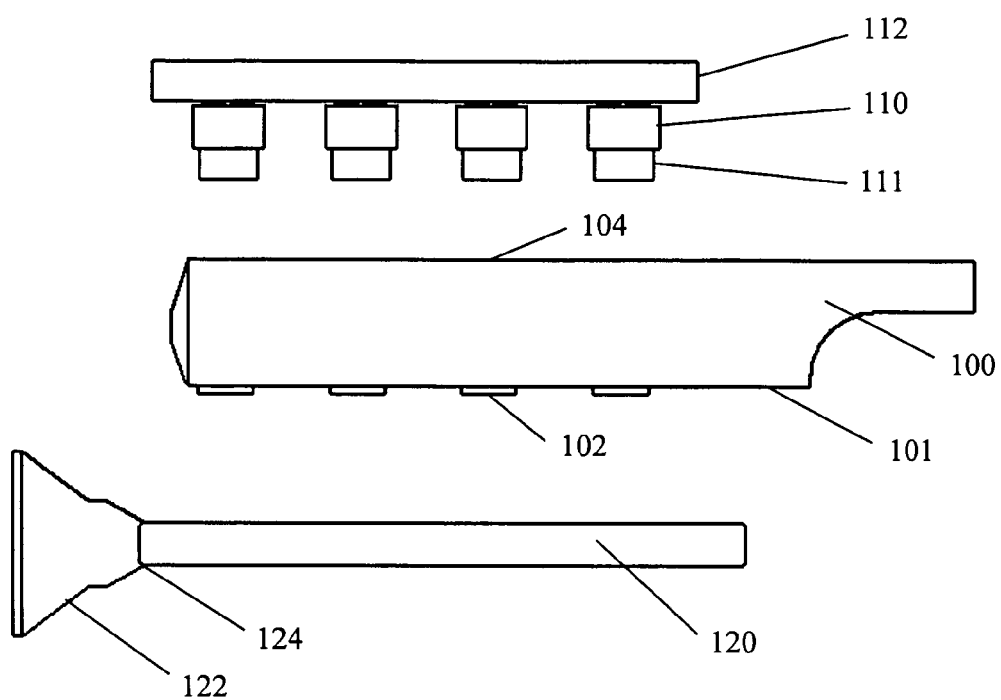
FIG. 10 illustrates a side elevation view of an exemplary arrangement of one embodiment of a wax pattern welding system, a wax runner, and wax patterns in preparation for welding the wax patterns to the wax runner.

FIG. 10 illustrates a side elevation view of an exemplary arrangement of one embodiment of a wax pattern welding system 100, having two opposed and generally parallel heating surfaces, together with wax runner 120 and wax patterns 110 just prior to welding the wax patterns to the wax runner. In this example, the wax pattern welding system 100 is interposed temporarily between wax patterns 110, which are held by pattern holder 112, and a wax runner 120. The wax patterns include wax pattern gates 111. As illustrated in FIG. 10, wax runner 120 is located below bottom surface 101 of the wax welding system having raised heating surfaces 102, and the wax patterns are positioned above an opposing heating surface 104 that is configured to contact the gates of the wax patterns. The wax patterns are arranged so that their gates face the heating surface of the wax pattern welding system that is configured to contact the wax pattern gates. Wax runner 120 in FIG. 10 is shown with a pour cup 122 at the head 124 of wax runner 120. Raised heating surface 102 has a vented recessed area for retaining molten wax when the raised heating surface of the bar of heat conducting material is pressed against the wax runner. In one exemplary embodiment, the raised heating surface 102 is a conformal surface in the general shape of the gate of a wax pattern to be fused to the wax runner.

After both the gates 111 of the wax patterns 110 and the wax runner 120 are heated by the wax pattern welding system 100, which is temporarily interposed between the wax patterns 110 and the wax runner 120, the wax pattern welding system 100 is withdrawn, and the wax pattern gates 111 are brought into contact with the wax runner 120 to weld the wax patterns to the wax runner. More particularly, the heated surface of each wax pattern gate is brought into contact with a pool of molten wax on a surface of the wax runner, and then, in one exemplary embodiment, the wax patterns and wax runner are separated slightly to form a fillet weld. As indicated by the arrows in FIG. 10, raised heating surfaces 102 of the wax pattern welding system are brought into contact with the wax runner to heat areas of the surface of the wax runner, producing pools of molten wax thereon, and surface 104 of wax pattern welding system 100 contacts and heats a surface of wax pattern gates 111. A process for assembling wax trees in which a fillet weld is formed between the gate of a wax pattern and a wax runner is described in greater detail in U.S. Pat. No. 6,910,519. U.S. Pat. No. 6,910,519, assigned to the instant assignee, is incorporated by reference herein in its entirety. The method of the present invention for producing a pool of molten wax on an area of a surface of a wax component is usable in the process of U.S. Pat. No. 6,910,519.

Figure 11:
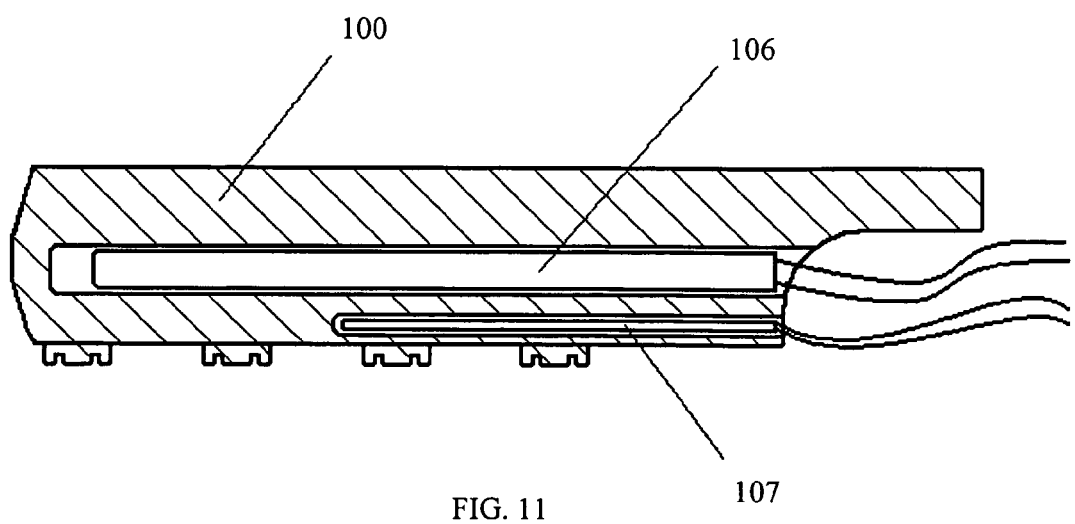
FIG. 11 illustrates a cross sectional view of the wax pattern welding system of shown in FIG. 10.

As illustrated in a cross sectional view of the wax pattern welding system of FIG. 10 depicted in FIG. 11, the wax pattern welding system further comprises heating element 106 and temperature sensor 107. The feedback from temperature sensor 107 may be used by a temperature controller to control heating element 106 to maintain the desired temperatures of the raised heating surfaces of the wax pattern welding system and the opposing heating surface that is configured to contact the gates of the wax patterns. One example of a temperature control loop circuit for a wax pattern welding system is described in U.S. patent application Ser. No. 10/601,932 entitled HEATED BLADES FOR WAX MELTING, which is incorporated by reference herein in its entirety.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A pattern welding system for producing a pool of molten wax on an area of a surface of a wax component, wherein the pattern welding system comprises:
    a piece of heat conducting material comprising
        a raised heating surface configured to contact a wax component, wherein the raised heating surface comprises a groove for retaining molten wax when the raised heating surface contacts the wax component, the raised heating surface comprising a continuous border surrounding the groove, and the raised heating surface comprising an inner land surrounded by the groove,
        another surface, and
        a vent structure,
            wherein the vent structure facilitates confining a pool of molten wax on an area of a surface of the wax component by providing a passage between the recessed area and an opening in the another surface for equalization of gas pressure in the groove with an ambient gas pressure; and
    means for heating the raised heating surface.

2. The pattern welding system of claim 1 wherein the piece of heat conducting material comprises a bar of heat conducting material.

3. The pattern welding system of claim 1 wherein the raised heating surface comprises at least another groove.

4. The pattern welding system of claim 1 wherein the raised heating surface further comprises a plurality of inner lands and at least one inner groove, the groove and the at least one inner groove being connected to form the plurality of inner lands.

5. The pattern welding system of claim 1 wherein a plurality of holes connect the groove to the vent structure.

6. The pattern welding system of claim 1 wherein the groove forms a continuous channel, the continuous channel being adjacent to the continuous border.

7. The pattern welding system of claim 1 wherein the inner land further comprises at least one inner groove.

8. The pattern welding system of claim 1 wherein a volume of the groove is proportional to an area of the inner land.

9. The pattern welding system of claim 1 wherein a volume of the groove is function of an area of the inner land and an area of the border.

10. The pattern welding system of claim 4 wherein the vent structure facilitates confining the pool of molten wax on the area of the surface of the wax component by providing a passage between one or more of the at least one inner groove and the opening in the another surface for equalization of gas pressure in the recessed area with the ambient gas pressure.

11. The pattern welding system of claim 4 further comprising at least another vent structure, wherein each of the at least another vent structure facilitates confining the pool of molten wax on the area of the surface of the wax component by providing a passage between one or more of the groove and the at least one inner groove and an opening in the another surface to facilitate equalizing gas pressure in the one or more of the groove and the at least one inner groove with the ambient gas pressure.

12. The pattern welding system of claim 5 wherein a cross-sectional area of the opening in the another surface is approximately twice a total cross-sectional area of the plurality of holes connecting the groove to the vent structure.

13. The pattern welding system of claim 5 wherein a majority of the plurality of holes are located at approximately one-inch intervals along a path within the groove.

14. A pattern welding system for producing a pool of molten wax on an area of a surface of a wax component, wherein the pattern welding system comprises:
   a piece of heat conducting material;
   means for heating the piece of heat conducting material; and an attachable piece of heat conducting material comprising
      a raised heating surface configured to contact a wax component, wherein the raised heating surface comprises a groove for retaining molten wax when the raised heating surface contacts the wax component, the raised heating surface comprising a continuous border surrounding the groove, and the raised heating surface comprising an inner land surrounded by the groove,
      another surface, and
      a vent structure,
      wherein the vent structure facilitates confining a pool of molten wax on an area of a surface of the wax component by providing a passage between the recessed area and an opening in the another surface for equalization of gas pressure in the groove with an ambient gas pressure,
   the attachable piece of heat conducting material being configured to be fastened to the piece of heat conducting material in a manner such that the raised heating surface may be heated by the means for heating the piece of heat conducting material.

15. The pattern welding system of claim 14 wherein
   the raised heating surface further comprises a continuous border surrounding the groove.

16. A method of producing a pool of molten wax on an area of a surface of a wax component using a wax pattern welding system in preparation for fusing the wax component to another wax component in assembling a wax tree, wherein the method comprises:
   providing a piece of heat conducting material comprising
      a raised heating surface configured to contact a wax component, wherein the raised heating surface comprises a recessed area for retaining molten wax when the raised heating surface contacts the wax component,
      another surface, and
      a vent structure, wherein the vent structure facilitates confining a pool of molten wax on an area of a surface of the wax component by providing a passage between the recessed area and an opening in the another surface for equalization of gas pressure in the recessed area with an ambient gas pressure;
   heating the raised heating surface; and
   temporarily positioning the raised heating surface of the piece of heat conducting material in contact with the wax component.

17. The method of claim 16 further comprising penetrating a surface of the wax component with the raised heating surface as wax of the surface of the wax component melts to displace molten wax into the recessed area of the raised heating surface.

18. The method of claim 17 further comprising retracting the raised heating surface from contact with the wax component to leave the pool of molten wax on the area of the surface of the wax component.

* * * * *